United States Patent [19]
Valyi

[11] 4,145,392
[45] Mar. 20, 1979

[54] METHOD FOR THE PREPARATION OF HOLLOW PLASTIC ARTICLES

[76] Inventor: Emery I. Valyi, 5200 Sycamore Ave., New York, N.Y. 10471

[21] Appl. No.: 786,461

[22] Filed: Apr. 11, 1977

Related U.S. Application Data

[63] Continuation-in-part of Ser. No. 618,782, Oct. 2, 1975, abandoned, which is a continuation-in-part of Ser. No. 473,580, May 24, 1974, Pat. No. 3,966,378.

[51] Int. Cl.² .............................................. B29C 17/07
[52] U.S. Cl. .................................... 264/513; 264/516; 264/520; 264/530
[58] Field of Search ....................... 264/89, 90, 92, 94, 264/96–99, 296; 425/523, 526, 530, 533, 534

[56] References Cited
U.S. PATENT DOCUMENTS

| | | | |
|---|---|---|---|
| 3,776,991 | 12/1973 | Marcus | 264/97 X |
| 3,819,314 | 6/1974 | Marcus | 425/534 X |
| 3,944,643 | 3/1976 | Sato et al. | 264/97 |
| 4,061,705 | 12/1977 | Marcus | 264/89 |

*Primary Examiner*—Jan H. Silbaugh
*Attorney, Agent, or Firm*—Bachman and LaPointe

[57] ABSTRACT

Method and apparatus for the preparation of hollow plastic articles wherein an improved injection blow molding process is obtained and improved temperature control of the parison is obtained by the use of a plurality of molds and cores. At least one temperature controlled mold and core is used to adjust the temperature of the parison. The temperature adjusted parison is then stretched and/or blown in at least one second mold by a second core, cooled therein and transferred by at least one third ejector core to additional finishing molds for further cooling or to removal means.

21 Claims, 4 Drawing Figures

METHOD FOR THE PREPARATION OF HOLLOW PLASTIC ARTICLES

CROSS-REFERENCE TO RELATED APPLICATIONS

This application is a continuation-in-part of copending application Ser. No. 618,782, filed Oct. 2, 1975, for METHOD AND APPARATUS FOR THE PREPARATION OF HOLLOW PLASTIC ARTICLES by Emery I. Valyi, now abandoned which in turn is a continuation-in-part of Ser. No. 473,580, filed May 24, 1974 for METHOD AND APPARATUS FOR MAKING ORIENTED HOLLOW PLASTIC ARTICLES by Emery I. Valyi, now U.S. Pat. No. 3,966,378.

BACKGROUND OF THE INVENTION

This invention relates to the art of blow molding from a parison of articles of organic plastic material susceptible to the improvement of their properties by orientation and has for its principal objects the improved adjustment of the temperature of the parison, carrying out the steps of parison production, stretch orientation and circumferential orientation in a single uninterrupted, yet completely controlled sequence, and the provision of improved, oriented hollow articles and a method and apparatus for obtaining same.

The art teaches various methods and apparatus for obtaining blow molded articles of organic plastic material from a parison, such as in U.S. Pat. Nos. 3,349,155 and Re. 27,104. Generally these methods are characterized by forming a parison in a parison mold on a blow core, placing said formed parison and blow core into a blow mold and expanding said parison in the blow mold by means of fluid pressure.

While the blow molding operation tends to impart orientation to the article, such orientation is predominantly circumferential, i.e., not bi-axial. Also, the degree of such orientation is difficult to control. It is therefore difficult to obtain the advantageous properties in the article that bi-axial orientation is capable of providing.

It is known that the control of orientation depends largely upon the control of the temperature of the parison just prior to orientation. It is found that such temperature control is best obtained by enclosing the article prior to the orienting step in heating means that impart temperatures, preferably by contact with the corresponding surfaces of the parison, to the regions of the parison corresponding to the degree of deformation that is intended for such regions.

SUMMARY OF THE INVENTION

In accordance with the present invention, a method is provided for the preparation of hollow articles maintaining substantially consistent temperature control of the articles prior to orientation and/or prior to final expansion, while also obtaining an improved, controlled injection blow molding or stretch blow molding sequence. The process of the present invention comprises: providing a parison on a first core in a formable condition, locating said first core bearing said parison in a first mold, also termed the conditioning mold, retaining said parison in said first mold to adjust the temperature and temperature distribution thereof and separating said first core from the parison, transferring said parison having adjusted temperature distribution to a second core from said first mold, locating said second core bearing said parison in a second mold, expanding said parison in said second mold into a finished article, preferably including orienting said parison both in the axial and radial directions, retaining and cooling said finished article in said second mold and separating said second core therefrom, preferably trannsferring said finished article to a third core, and ejecting said finished article from said third core, wherein the first and second cores and also the third core if used in a direction parallel to the axis of said parison, and wherein the first and second molds move in a lateral direction relative to the parison axis, preferably only in a lateral direction.

In accordance with the present invention, the parison may be caused to establish intimate surface contact between the walls of the first mold and the parison, such as by expanding said parison in the first mold to assume an intermediate shape corresponding to that of the first mold. The pre-expanded shape may be chosen so as to permit the insertion therein of a second core into intimate surface contact with the inside of the parison. The pre-expanded parison is therefore in full surface contact with the pre-forming mold for adjustment of the temperature of the pre-expanded parison, and possibly also in full surface contact with the second core. The temperatures of the first mold, of the second core, or of both, may be controlled to provide optimum conditions in the pre-expanded parison for orientation thereof.

Alternatively, the parison may be stripped from the first core into the first mold without expanding the parison, in which case the shape of the first mold must be substantially the same as that of the parison to insure adequate surface contact between the two. At times, the parison may be placed within a heated cavity that does not correspond to the shape of the parison, such heated cavity taking the place of the first mold. This heated cavity is the equivalent of the first mold in the present context and it will be included within the term "first mold" throughout the present specification.

In view of the plural cores and molds used in the present invention and the high degree of temperature control which can be exercised over the parison, the present invention may readily obtain a multi-axially-oriented article by axially stretching the temperature adjusted parison at a predetermined rate in the second mold by means of the second core prior to the expansion step. Furthermore, the axial and lateral movements of the blow cores and blow molds respectively provide a highly efficient and smooth operation.

If it is desired to produce a multi-layered parison and a multi-layered final article, the first core may be provided with a layer of one plastic and a subsequent layer may then be pressure molded therearound in accordance with my U.S. Pat. Nos. 3,349,155, 3,717,544 and 3,719,735. It should be understood, therefore, that where the general description that follows refers simply to parisons, the method and apparatus of the present invention are applicable to multi-layered as well as single-layered parisons.

The apparatus of the present invention comprises: a first core and a temperature controlled first mold, means for providing a parison on said first core, means including said first core to place said parison in said first mold, means for separating said parison from said first core while retaining said parison in said first mold to adjust the temperature thereof, a second core and a second mold, means for transferring said parison to said second core and said second mold, means to expand said parison on said second core in said second mold to provide a finished article, means for separating said finished article from said second core while retaining said finished article in said second mold to cool same, preferably a third core, means to transfer said finished article to said third core, and means to eject said finished article from said third core, wherein said molds are in spaced relationship to each other and move in a lateral direction relative to the parison axis, preferably only in a lateral direction, and said cores are in spaced relationship to each other and move in a direction parallel to the parison axis, preferably only in a direction parallel to the parison axis. A multi-oriented article may be obtained by providing means for axially stretching the temperature adjusted parison at a predetermined rate prior to the expansion step, such as by an axially reciprocable portion of the second core that is actuated by means capable of adjusting the speed of reciprocation.

It can be seen that the process and apparatus of the present invention efficiently and conveniently obtains uniform temperature control of the parison so that the resultant article is characterized by highly improved properties, while still obtaining a high production rate. It is known that orientation substantially improves the significant properties of plastics, as clarity, impact resistance, strength, resistance to permeation, etc. Among the plastics that can be so improved are polystyrene, polyvinyl chloride, polyolefins, as polethylene and polypropylene, polyesters, polyamides, acrylics, acrylonitrile, and methacrylonitrile polymers. The improved temperature control of the present invention enables one to obtain improved properties and controlled multi-axial orientation in a simple and expeditious manner.

Accordingly, it is a principal object of the present invention to provide a method and apparatus for the preparation of hollow articles from moldable organic plastic material which enables accurate temperature control.

It is a further object of the present invention to conveniently and expeditiously provide improved articles which are multi-axially oriented under conditions of close control of temperature and deformation rate.

It is a still further object of the present invention to provide a method and apparatus as aforesaid which provides products possessing reproducibly uniform properties due to orientation.

Other objects and advantages of the present invention will be apparent to those skilled in the art from the description which follows with reference to the accompanying drawings.

DETAILED DESCRIPTION OF THE PREFERRED EMBODIMENTS

Figure 1:
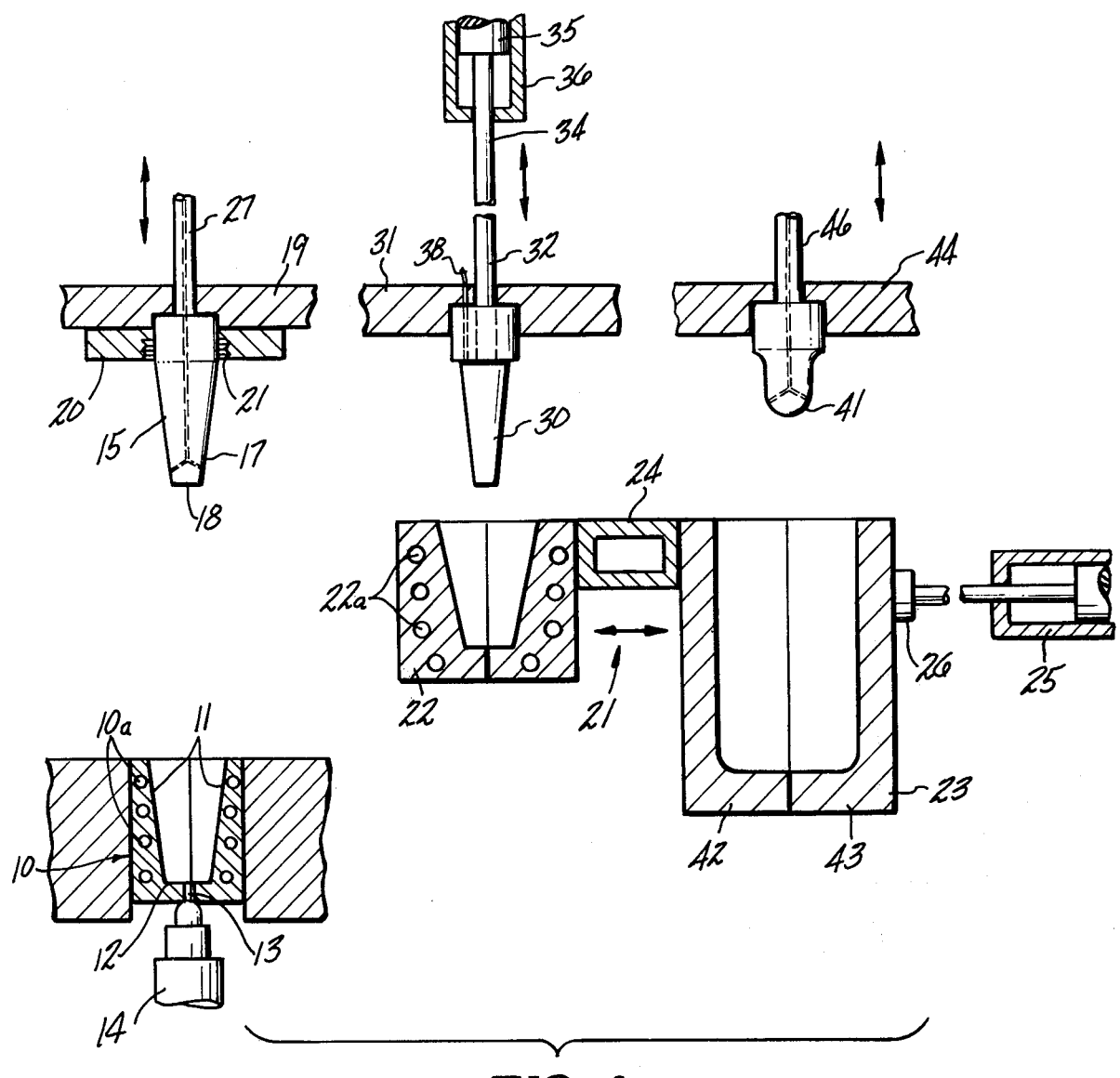
FIG. 1 is an elevation, partly in section, illustrating the method and apparatus of the present invention.
Figure 2:
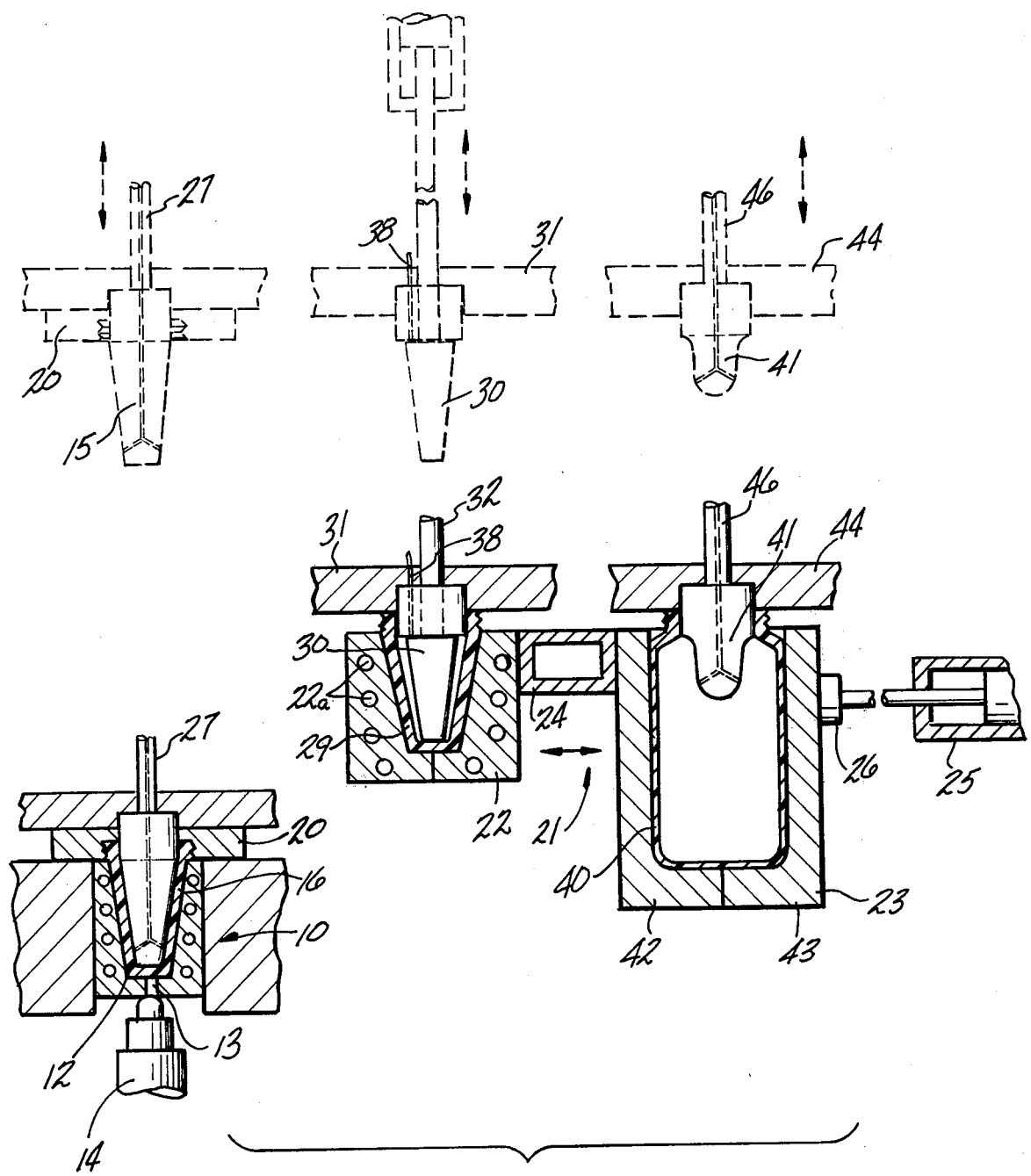
FIGS. 2 and 3 are views similar to FIG. 1 with additional portions in phantom showing a sequence of operations according to an embodiment of the present invention.
Figure 3:
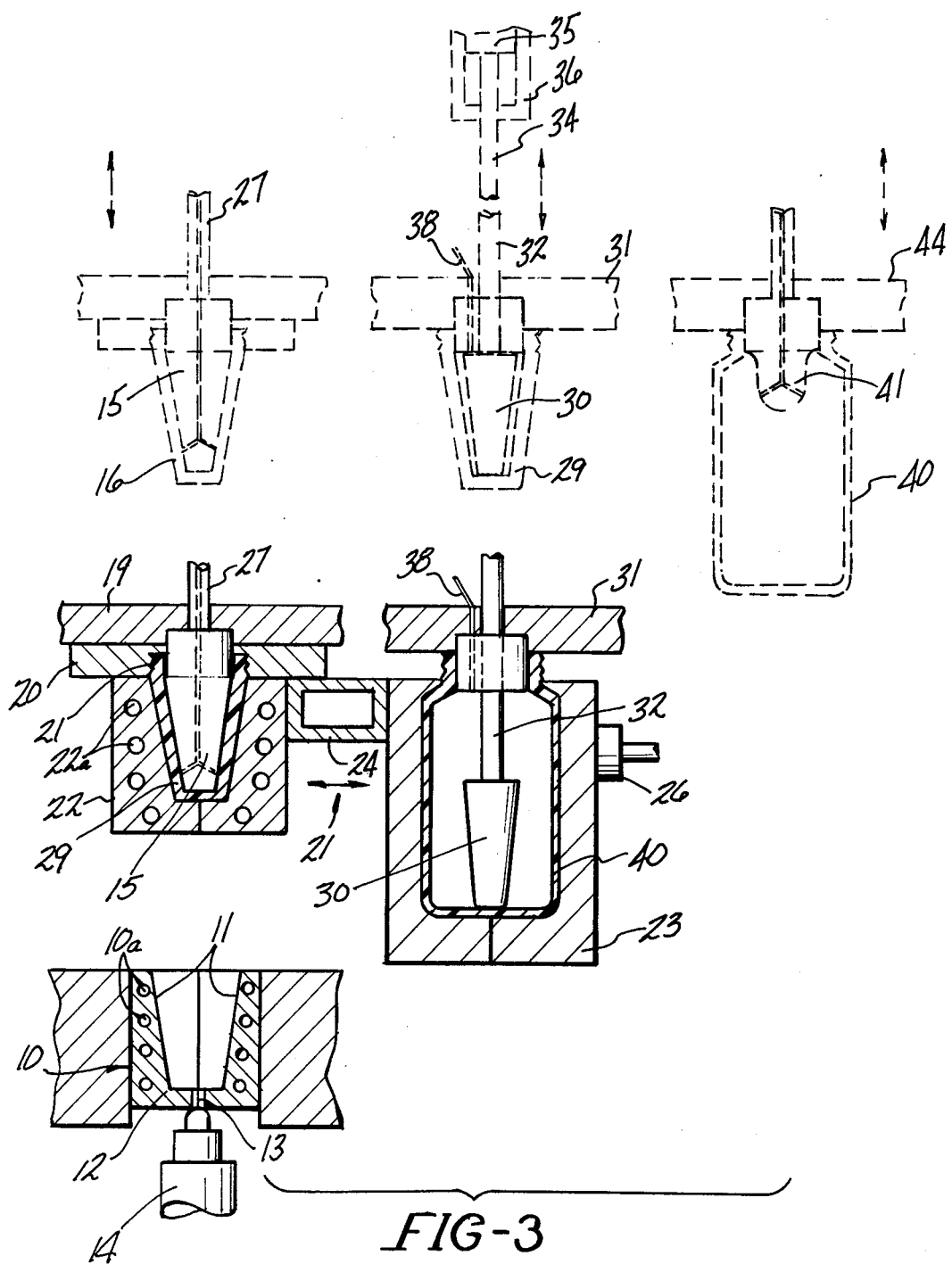

Referring to the drawings in more detail, FIGS. 1, 2 and 3 illustrate a method and apparatus in accordance with one embodiment of the present invention. In this embodiment, the parison is provided by an injection molding process; however, the invention is not limited thereto and includes other known molding processes that are capable of producing parisons such as compression molding, casting, extrusion with or without secondary operation, and the like. FIG. 1 depicts a parison die 10, having outer walls 11 which may be separable, depending upon the shape of the parison and which are adapted to form the outer surface of the parison, and having an end wall 12 shaped to form the end wall of the parison. The parison die 10 may be temperature controlled, such as by heating or cooling elements 10a contained therein which are connected to an appropriate heat transfer source (not shown). The end wall 12 of the parison die has an injection opening 13 registering with an injection nozzle 14 through which the organic plastic material is injected into the parison die. The parison die 10 is shown as split for convenience in opening to release the formed parison; however, it should be understood that the invention is not limited thereto, as one-piece dies having suitable release mechanisms known in the art are encompassed herein.

As indicated hereinabove, the plastics contemplated in accordance with the present invention are the moldable organic plastic materials and preferably those whose properties are improved by orientation, such as the polyolefins, polyethylene, polypropylene and copolymers thereof, polyvinyl chloride, polystyrene and other styrenic resins, acrylonitrile, methacrylonitrile, polyvinylidene chloride, polycarbonates, polyesters, polyamides, etc.

The formation of the parison in accordance with the embodiment illustrated in FIGS. 1, 2 and 3 takes place after a first core 15 (preferably a blow core) illustrated in FIG. 1, and set forth in phantom in FIGS. 2-3, and die 10 are brought into engagement. Upon completion of injection through nozzle 14, a parison 16, having substantially the configuration represented in FIG. 2, is formed.

Core 15 provides a side wall 17 and an end 18 for the formation with walls 11 and 12 of parison die 10, and, with the neck mold 20, of a die cavity in which the parison is formed. Core 15 may be temperature controlled, such as by internal heat exchange circuits known in the art contained therein, which are connected to an appropriate heat transfer or power source (not shown). Core 15 is carried by platen 19. This assembly further includes a neck mold 20 in which the neck of the parison is formed and which remains engaged with the parison while the latter is on blow core 15 after disengagement from the parison die. The neck mold may possess threads 21 for defining a threaded opening in the final molded object. The neck mold 20 may be split and opened into two portions by suitable mechanical means (not shown) to release the parison, or, if the configuration of the neck permits, may be of one piece construction and, thus, removable from the parison as a unit.

Upon separation of the parison die 10 and the core 15 bearing parison 16 sufficiently retained thereon by means of first neck mold 20, but which may also be retained thereon by other means, as an undercut as is well known in the art, if necessary, the latter assumes the position depicted in FIG. 1 and shown in phantom in FIG. 3. Mold assembly 21 comprises a first mold 22 which is a conditioning, i.e., tempering mold and may be a pre-forming mold or pre-blow mold and also a second mold 23 which is a finishing mold, such as a blow mold or stretch blow mold, said mold assembly and blow core 15 are brought into alignment so as to juxtapose first mold 22 and parison 16, illustrated, as noted earlier in phantom in FIG. 3. First mold 22 and second mold 23 are maintained in integral spaced relationship by connecting member 24, and are arranged for common reciprocation in a lateral direction, for example, by means of hydraulic cylinder 25 which is illustrated in FIG. 1 as connected to second mold 23 by the attachment labeled 26 thereon. The assembly may be supported to traverse between the positions suggested in FIGS. 2 and 3, respectively, by conventional means, such as tie bars or rails, not shown herein. Assembly 21, as described above, is merely illustrative of one embodiment of this invention and is capable of modifications in design and operation, as illustrated in the aforesaid parent application Ser. No. 473,580.

Referring now to FIG. 3, upon the alignment of first mold 22 and core 15 bearing parison 16, as noted earlier, core 15 and parison 16 are then placed within first mold 22, for example, in the manner indicated in the figure. Other means of engaging parisons and molds may be used and are well known, such as those disclosed in U.S. Pat. Nos. 2,853,736 and 2,974,362. The parison is then released from first core 15 into first mold 22, as by stripping it axially which may be facilitated, if desired, by partially expanding the parison. The temperature of first mold 22 is controlled by heating or cooling means 22a connected to appropriate heat transfer sources (not shown), or by electric heaters, to optimize the parison temperature for subsequent operations in a manner to be described below. Naturally any suitable heating or cooling means may be used in any of the heating or cooling coils described herein, such as a passage containing heat transfer fluid maintained at a suitable temperature, electric resistance heaters or radiant heat sources. As is illustrated in the figures, release of the parison into the first mold 22 is effected by expanding it away from the first core 15 and removing the core therefrom. It should be noted that such expansion is not always necessary, but is often helpful as in the example shown. When desired, such expansion of the parison may be achieved by the provision of fluid under pressure through passage 27 provided within blow core 15 for that purpose, said passage terminating at a valve-like, closeable portion of the core well known in the art (not shown). FIG. 3 illustrates the extent of expansion, as the perimeter of the pressure molded parison 16 is represented in phantom and partially expanded parison resulting from the exertion of fluid pressure is labeled 29. At times the shape of partially expanded parison 29, as determined by the mold cavity in first blow mold 22, may be made such that a second blow core, e.g., core 30, may be inserted into substantially complete surface contact therein, as shown in FIG. 2, a desirable condition permitting heat exchange by contact of the second core and the parison. In such an instance, the said shape should exhibit no undercuts or reverse curves on the inside surface due to an inward taper over its inside surface. However, the parison shape does not always permit this, for example, in the case of a long, narrow necked parison, in which cases it may be necessary to forego contact heating the inside of the parisons.

After completion of the transfer of the parison into first mold 22, that mold and first core 15 are separated as by moving the first core plus first neck mold axially in the direction of the arrow, and the parison 29 thus transferred is retained in first mold 22. Core 15 and neck mold 20 are then returned to the starting position as illustrated in FIG. 1, and mold assembly 21 including first mold 22 containing the parison 29 which may be partially expanded, is shifted laterally into the position illustrated in FIGS. 1 and 2.

Parison 29, which is retained within first mold 22, is thereby transferred into alignment with a second blow core 30 which is carried by platen 31 and which may be provided with temperature control means, and which may have an external configuration shaped to conform to the internal configuration of the parison 29. Whenever axial stretching of the parison is desired, core 30 will include a stretch and blow assembly which comprises a mandrel extension 32 which is reciprocable as indicated by the arrow in FIG. 1 to axially extend the parison 29. An actuating means is shown which comprises a push rod 34 which engages extension 32, and which is connected to a piston 35 housed within a cylinder 36 which may, for example, be responsive to hydraulic pressure exerted by a pump, not shown. By controlling the flow of fluid into cylinder 36, the speed of piston 35 and therefore of the movable portion of core 30 may be controlled to stretch the parison at the speed best suited for the temperature of the parison. Such actuating means is merely illustrative of one manner of operation, as other actuating means known in the art can be employed herein. If a highly oriented article is not desired, the axial extension operation may be dispensed with.

For the final forming sequence, the parison is separated from first mold 22 by retaining it on core 30 such as by close fit of core 30 within the neck of the parison. Blow core 30 is situated in the same spaced relationship to blow core 15 as exists between first mold 22 and second mold 23, to enable both cores to engage a respective mold when core 15 is aligned with mold 22. This facilitates the concurrent pursuit of both the preforming and final forming processes with separate parisons. Further, and with regard to the transfer of parison 29 to core 30, it should be noted that parison die 10 is spaced from first mold 22, as illustrated in FIGS. 1 and 2, so that core 15 may engage with die 10 to form another parison while core 30 engages with first mold 22 and also while a third core 41 ejects the fully expanded article 40. The ability to concurrently conduct the various operations of the process outlined herein comprises one of the notable advantages of the invention. The simultaneous formation, transfer, or final expansion and finished article removal of a plurality of parts is envisioned, as the apparatus illustrated in the accompanying figures can be further modified to provide additional intermediate molds and cores, such as mold 22 and core 30.

If a large volume operation is desired, then a multiplicity of mold cavities and cores will be employed at each operating station, as is customary in the art.

As is stated above, parison 29 is transferred to core 30 for further processing. Blow core 30 is carried by platen 31 and engages parison 29 by being inserted into the neck thereof with a tight fit.

A fluid passageway 38 is provided and terminates at the end surface of that portion of the core 30 which does not move during the movement of extension 32. Fluid passageway 38 also connects to a source of fluid under pressure, not shown. Accordingly, fluid may enter the space inside parison 29 during final expansion, discussed hereinafter, once passageway 38 is opened by movement of the extension 32 and correspondingly of the moveable portion of core 30.

In the instance where core 30 may be made to conform to the inner contour of parison 29, it can be seen that core 30 may be heated or cooled. Thus, the temperature of parison 29 may be adjusted by heat exchange between both the inner and outer surfaces of parison 29 and the corresponding mold and core surfaces.

The parison 29 is thereby rapidly and uniformly prepared for further processing, such as axial extension and final expansion. This is a considerable advantage since it avoids the problem of parison cooling during a multi-step process. Whenever core 30 may be made to conform to the shape of parison 29, the heat transfer conditions may be further improved over the ones prevailing if only the outer surface of parison 29 is in heat transfer relation with a corresponding mold element. Naturally, the conventional temperature regulators that are used to control the heating means of core 30 and mold 22 are able to do so individually, in several zones within the assembly, corresponding to the desired temperature profile.

In the interest of a rapid operating cycle, it is particularly advantageous to first rapidly alter the heat content of parison 16 by heat exchange with core 15 and mold 10. Any such rapid cooling necessarily results in an unequal distribution of temperature in said parison. This must be followed by substantially equalizing the temperature distribution in the walls of said parison by heat exchange with pre-forming mold 22 and, whenever made to conform with the inner wall of the parison, with core 30, to avoid a layer-wise pattern of properties in the finished article corresponding to the known relationship between such properties and the deformation temperatures. Thus, for example, one can form parison 16 by injection molding, rapidly cool said parison by heat exchange with core 15 and mold 10 sufficiently to remove therefrom heat sufficient to correspond to the average difference between injection temperature and optimum deformation temperature. This will result in said unequal temperature distribution. The parison may be further cooled or heated at times by heat exchange with core 30 (which need not necessarily have a configuration shaped to conform to the parison), but always with first mold 22, to substantially equalize the temperature distribution of said parison, all in a controlled manner, and to impose thereon the temperature profile desired for orientation. Alternatively, in accordance with the present invention, a pre-formed parison may be placed in mold 10, heated rapidly in mold 10 by heat exchange with mold 10 and core 15, which is apt to produce said unequal temperature distribution, and further heated in mold 22 by heat exchange with mold 22 and core 30 to substantially equalize the temperature distribution of said parison. The foregoing provides the considerable advantages of enabling the attainment of a predetermined temperature profile of the parison resulting in optimum conditions for orientation without excessive dwell time in the mold. The first mold is freed for further use while the first mold is completing the conditioning of the parison, resulting in an expeditious processing cycle.

Referring to FIG. 2, the transfer of parison 29 to finishing mold 23 is conducted by blow core 30 which is in engagement with first mold 22 and parison 29. Blow core 30 with parison 29 thereon is separated from first mold 22, which may be split to release parison 29, by moving blow core 30 axially. Upon release, core 30 with parison 29 thereon returns to the position illustrated in FIG. 1 and depicted in phantom in FIG. 3.

Upon completion of the above transfer, mold assembly 21 is laterally shifted so as to juxtapose the finishing mold, i.e., second mold 23, and blow core 30 while at the same time aligning first mold 22 and core 15, as described earlier and depicted in FIG. 3. The blow cores are then received within the respective molds, with the temperature of parison 29 having been adjusted as described above. Parison 29 is usually axially extended to the bottom of mold 23 by the advancement of the moveable portion of mandrel 32 by means of push rod 34 at a predetermined rate. Thus, the present invention may controllably stretch the parison longitudinally before final blowing and thereby produce orientation in the axial direction as well as the orientation subsequently produced by blowing. It can be seen that the temperature of the parison preparatory to stretching and blowing may be properly and conveniently controlled within the respective molds and cores.

After the completion of axial extension, the parison is fully expanded to conform to the configuration of finishing, i.e., second mold 23, to form the final object 40 which, in the embodiment illustrated herein, is an open-ended container. Naturally, a wide variety of shapes may be prepared, as the commercially known shapes which may be a bottle, a jar or a cup-shape. Full expansion is accomplished by supplying fluid under pressure through passageway 38 into the interior of axially extended parison 29.

After full expansion is completed, second core 30 and second mold 23 containing final object 40 are separated in the same fashion described earlier with reference to first core 15 and first mold 22 by moving the second core 30 in an axial direction, with the second core 30 being positioned as shown in phantom in FIG. 2. Referring further to FIG. 2, mold assembly 21 is shifted laterally, and second mold 23 is positioned for removal of final object 40, which is by then cooled sufficiently for that purpose by placing the second mold 20 into juxtaposition with third core 41.

Removal of article 40 is then conducted by moving core 41, which may be carried by platen 44, axially into engagement with article 40. In the embodiment illustrated herein, finishing mold 23 is longitudinally split into two sections labeled 42 and 43, which may reciprocate in and out of communication by an actuating means, not shown, such as for example a hydraulic cylinder. Thus sections 42 and 43 may be parted an amount sufficient to permit the removal of article 40 by core 41 which may be inserted into the neck thereof with a tight fit in a manner similar to core 30. Naturally, if desired, neck molds may be used for cores 30 and 41 similar to neck mold 20. Prior to such removal, fluid pressure may be applied through passageway 46 to continue the blowing process, if desired, in cases requiring continued contact of article 40 with second mold 23 for the purpose of extended cooling.

Thus it can be seen that the present invention improves the injection blow molding process and carries out the steps of parison production, stretch orientation and circumferential orientation in a single uninterrupted and completely controlled sequence. Parisons are injected or provided in a first station and are moved axially from the first station on a first core. The parisons are then transferred by the first core into a first or tempering mold which is shifted laterally into alignment with the first core for that purpose. The first mold is then shifted laterally with the parison therein into a second station wherein a second core is inserted into the parison and the second core with parison thereon is moved axially away from the first mold. A second mold is then shifted laterally into alignment with the second core and parison and the tempered parison is transferred into the second mold by axial movement of the second core. The parison is then axially stretched at a controlled rate and blown into conformance with the second mold. The second core is removed axially from the second mold containing the final article therein, the second mold is shifted axially to a third station bringing the final article into alignment with a third or ejector core, and the final article is removed from the second mold after having sufficiently cooled therein by the ejector core for depositing on a conveyor in an oriented position, if desired.

The apparatus and process of the present invention is simple, convenient and progressive in nature. The parison moves from the injection mold to blow core; from blow core to tempering mold; from tempering mold to stretch-blow core; from stretch-blow core to finishing mold; from finishing mold to ejection core; and out. The movement of components is quite simple and convenient, with the core moving axially and molds moving laterally.

The temperature adjustment of the parison afforded by the present invention has been found to provide an oriented product having consistently good properties. The parison is injected into a comparatively cool mold and left there for a very short time, long enough to remove the amount of heat from the parison that corresponds to the condition best suited for orientation. The parison is then transferred into a tempering mold which imparts the optimum orientation temperature distribution to the given plastic article, staying in that mold long enough to equalize the temperature across the wall thickness of the parison which naturally arrives from the injection mold with a poor cross-sectional temperature profile. After tempering, the parison, now having the right temperature profile with good cross-sectional distribution, is transferred into a cool finishing mold in which it is stretched at a controlled rate and blown. The steps of injection plus dwell in the injection mold; of tempering and of stretch-blowing with cooling overlap; and of article removal, occur at the same time allowing for efficient machine utilization. Also, the axial core movement and lateral mold movement allow for smooth operation.

Naturally, many variations may be included. Injected or blown necks may be made. The stretch function may be omitted in which case a very efficient injection blow molding operation is provided. Instead of tempering, the second station may be used as a first blow station and the third station may be used as a second blow station in order to divide the cooling dwell between the two. This may be desirable in the case of thick-walled articles. In fact, additional cooling stations may be added.

In one modification, the parison may be formed earlier at a time and location of its own and stored before being formed into the final article. In addition to injection molding, numerous methods are known that may be employed to provide thermoplastics in the shape of a parison, such as tube extrusion with welding of one open end, dipping, deposition, thermoforming and the like. Thus, the previously formed parison may be transported to and placed upon a first blow core which cooperates with a heating means to raise the temperature of the parison sufficiently to enable it to undergo deformation.

Figure 4:
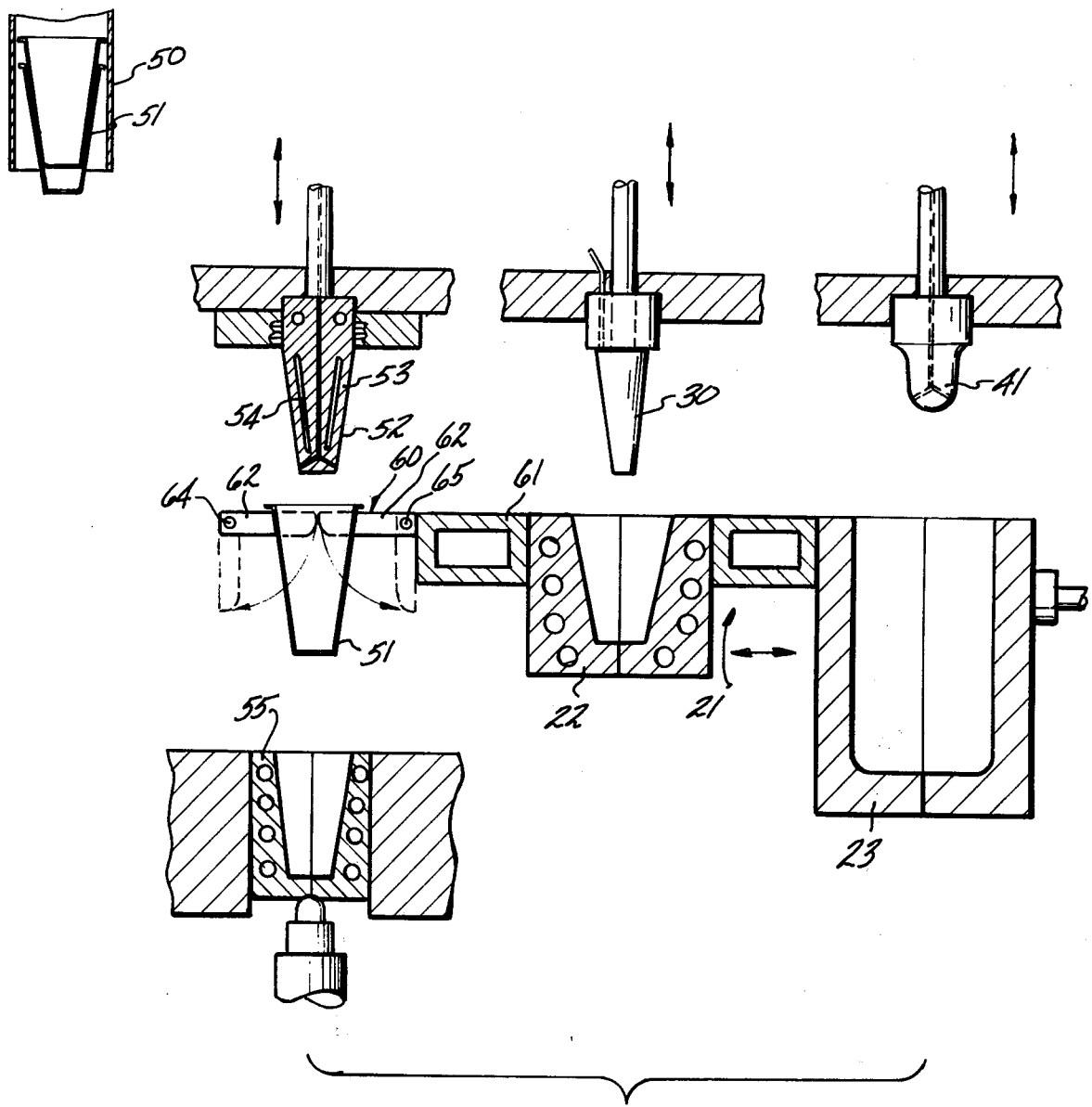
FIG. 4 is an elevated view, partly in section, illustrating an alternate method and apparatus of the present invention.

In another modification, the method and apparatus of the present invention are readily adapted for the preparation of composite, line hollow articles, for example, as described in my U.S. Pat. No. 3,737,259. An apparatus of this type is shown in FIG. 4 wherein dispenser 50 contains a quantity of previously formed liners 51 which are singly released into transfer frame 60 by any desired means. The transfer frame is integrally connected to mold assembly 21 by means of connecting member 61 so that the transfer frame 60 is in alignment with dispenser 50 when first mold 22 is in alignment with core member 52. Transfer frame 60 consists of two linear transfer plates 62 and 63 pivotally connected to the transfer frame by hinges 64 and 65 so that the plates 62 and 63 fall away and assume the position shown in phantom when core member 52 engages linear 51 and moves downwardly towards parison mold 55. Core member 52 substantially resembles blow core 15 of FIG. 1, if necessary including the feature that mandrel 53 contains heat exchange means 54 which may be electric cartridge heaters or passages containing heated fluid maintained at an elevated temperature by external heating means, not shown.

In addition to heated core member 52, a temperature controlled parison mold 55, which is in all respects identical to parison mold 10, may be employed to inject plastic around core 52 and liner 51 thereon.

Mold 55 and dispenser 50 are axially aligned with core 52 so that core 52 may move axially in the direction of the arrow to engage liner 51, retract axially with the linear thereon while dispenser 50 moves laterally and then move axially to engage mold 55. The processing cycle is then completed as in the previous embodiment.

It should be understood that the cores may, if desired, be adapted for lateral as well as axial movement and the molds adapted for axial as well as lateral movement.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a method for the preparation of oriented hollow objects of organic plastic material by providing a parison on a core in a formable condition, locating said parison in a blow mold and expanding said parison within said blow mold to form a hollow object, the improvement which comprises: providing said parison on a first core in a formable condition; locating said first core bearing said parison in a first mold; retaining said parison in said first mold to adjust the temperature thereof for conditions suited for orientation and separating said first core from the parison; transferring said temperature adjusted parison to a second core from said first mold; locating said second core bearing said parison in a second mold; expanding said parison in said second mold into a finished article; retaining and cooling said finished article in said second mold and separating the second core therefrom, transferring said finished article to a third core from said second mold, locating said third core bearing said finished article laterally of said second mold; and ejecting said finished article from said third core, wherein said cores move only in a direction parallel to the parison axis and said molds move only in a lateral direction relative to the parison axis.

2. A method according to claim 1 wherein the parison is pre-formed in said first mold while on said first core to facilitate separation of the parison from the first core.

3. A method according to claim 1 wherein the parison is formed on said first core by injection molding in a parison mold and retained on the first core in the parison mold to adjust the temperature thereof.

4. A method according to claim 1 wherein the parison is axially extended by said second core in said second mold prior to expanding.

5. A method according to claim 4 wherein said parison is axially extended at a predetermined rate.

6. A method according to claim 1 wherein said steps are conducted continuously and concurrently.

7. A method according to claim 1 wherein said parison is secured to at least said first core by a neck mold.

8. A method according to claim 1 wherein the parison is formed on the first core by transferring a previously formed liner to said first core, followed by placing the liner covered core in a parison mold, followed by injection molding an outer layer over said liner to form a composite parison.

9. A method according to claim 1 wherein the parison is maintained in contact with the walls of the first mold while the temperature thereof is being adjusted.

10. A method according to claim 1 wherein the parison is out of contact with the walls of the first mold while the temperature thereof is being adjusted.

11. A method according to claim 1 wherein a parison is formed on the first core by injection molding in a parison die and including the steps of cooling the parison in said parison die while on the first core at a rate resulting in a temperature differential across the walls of the parison, and substantially equalizing said temperature differential during said temperature adjustment step in said first mold.

12. In a method for the preparation of oriented hollow objects of organic plastic material by providing a parison on a core in a formable condition, locating said parison in a blow mold and expanding said parison within said blow mold to form a hollow object, the improvement which comprises: providing said parison on a first core in a formable condition; locating said first core bearing said parison in a first mold; retaining said parison in said first mold to adjust the temperature thereof for conditions suited for orientation and separating said first core from the parison; transferring said temperature adjusted parison to a second core from said first mold; locating said second core bearing said parison in a second mold; axially extending said parison by said second core in said second mold; expanding said parison in said second mold into a finished article; retaining and cooling said finished article in said second mold and separating the second core therefore, transferring said finished article from the second mold to a third core; locating said third core bearing said finished laterally of said second mold; and ejecting said finished article from said third core, wherein said cores move only in a direction parallel to the parison axis and said molds move only in a lateral direction relative to the parison axis.

13. A method according to claim 12 wherein the parison is pre-formed in said first mold while on said first core to facilitate separation of the parison from the first core.

14. A method according to claim 12 wherein the parison is formed on said first core by injection molding in a parison mold and retained on the first core in the parison mold to adjust the temperature thereof.

15. A method according to claim 12 wherein said steps are conducted continuously and concurrently.

16. A method according to claim 12 wherein the parison is formed on the first core by transferring a previously formed liner to said first core, followed by placing the liner covered core in a parison mold, followed by injection molding an outer layer over said liner to form a composite parison.

17. A method according to claim 12 wherein the parison is maintained in contact with the walls of the first mold while the temperature thereof is being adjusted.

18. A method according to claim 12 wherein the parison is out of contact with the walls of the first mold while the temperature thereof is being adjusted.

19. A method according to claim 12 wherein a parison is formed on the first core by injection molding in a parison die and including the steps of cooling the parison in said parison die while on the first core at a rate resulting in a temperature differential across the walls of the parison, and substantially equalizing said temperature differential during said temperature adjustment step in said first mold.

20. In a method for the preparation of composite hollow objects of organic plastic material by providing a composite parison on a core in a formable condition, locating said parison in a blow mold and expanding said parison within said blow mold to form a hollow object, the improvement which comprises: providing said parison on a first core in a formable condition by transferring a previously formed liner to said first core, followed by placing the liner covered core in a parison mold, followed by injection molding an outer layer over said liner; locating said first core bearing said parison in a first mold; retaining said parison in said first mold to adjust the temperature thereof and separating said first core from the parison; transferring said parison to a second core from said first mold; locating said second core bearing said parison in a second mold; expanding said parison in said second mold into a finished article; retaining and cooling said finished article in said second mold and separating the second core therefrom, and ejecting said finished article, wherein said cores move in a direction parallel to the parison axis and said molds move in a lateral direction relative to the parison axis, provided that liners are singly transferred to a transfer frame, said transfer frame and liner are moved into alignment between said first core and parison mold, and said liner is transferred to said first core during axial movement of said first core to said parison mold.

21. In a method for the preparation of composite oriented hollow objects of organic plastic material by providing a composite parison on a core in a formable condition, locating said parison in a blow mold and expanding said parison within said blow mold to form a hollow object, the improvement which comprises: providing said parison on a first core in a formable condition by transferring a previously formed liner to said first core, followed by placing the liner covered core in a parison mold, followed by injection molding an outer layer over said liner; locating said first core bearing said parison in a first mold; retaining said parison in said first mold to adjust the temperature thereof and separating said first core from the parison; transferring said parison to a second core from said first mold; locating said second core bearing said parison in a second mold; axially extending said parison by said second core in said second mold; expanding said parison in said second mold into a finished article; retaining and cooling said finished article in said second mold and separating the second core therefrom, transferring said finished article from the second mold to a third core; and ejecting said finished article from said third core, wherein said cores move only in a direction parallel to the parison axis and said molds move only in a lateral direction relative to the parison axis, provided that liners are singly transferred to a transfer frame, said transfer frame and liner are moved into alignment between said first and parison mold, and said liner is transferred to said first core during axial movement of said first core to said parison mold.

* * * * *

UNITED STATES PATENT OFFICE
CERTIFICATE OF CORRECTION

PATENT NO. : 4,145,392
DATED : March 20, 1979
INVENTOR(S) : Emery I. Valyi

It is certified that error appears in the above-identified patent and that said Letters Patent are hereby corrected as shown below:

In Column 2, line 6, change "trannsferring" to read ---transferring---.

In Column 2, line 9, after the word "used" insert ---move---.

In Column 10, line 15, change "linear" to read ---liner---.

In Column 10, line 18, change "linear" to read ---liner---.

In Column 10, line 33, change "linear" to read ---liner---.

In Column 11, line 57, claim 12, change "therefore" to read ---therefrom---.

In Column 11, line 59, claim 12, after the word "finished" insert ---article---.

In Column 14, line 5, claim 21, after the word "first" insert ---core---.

Signed and Sealed this

Twenty-sixth Day of June 1979

[SEAL]

Attest:

RUTH C. MASON
Attesting Officer

DONALD W. BANNER
Commissioner of Patents and Trademarks